United States Patent [19]
Icenogle

[11] Patent Number: 5,531,010
[45] Date of Patent: Jul. 2, 1996

[54] MARINE LOWER UNIT ALTERING PROCESS

[76] Inventor: Robert O. Icenogle, 1501 33rd St. SE., Ruskin, Fla. 33670

[21] Appl. No.: 413,839

[22] Filed: Mar. 30, 1995

[51] Int. Cl.$^6$ .................................................. B21K 21/16
[52] U.S. Cl. ...................................... 29/401.1; 29/426.1
[58] Field of Search .............................. 29/401.1, 426.1, 29/426.2; 440/66; 264/259

[56] References Cited

U.S. PATENT DOCUMENTS 5,307,550  5/1994  Brunet .................................. 29/402.13

Primary Examiner—David P. Bryant
Attorney, Agent, or Firm—Donald R. Bahr

[57] ABSTRACT

This invention is concerned with a process for altering a marine lower unit, the process having the steps of removing the marine lower unit from the marine engine; removing the mechanical componets from the marine lower unit; cleaning the marine lower unit, particle blasting the marine lower unit; welding a preformed casting to the marine lower unit; cleaning the marine lower unit; placing the marine lower unit in a preformed mold; pouring a hardenable liquid polymeric material into the mold and around the marine lower unit; allowing the polymeric material to harden; removing the marine lower unit from the mold; finishing the surface of the marine lower unit; sanding the marine lower unit; priming the marine lower unit and finish painting the marine lower unit.

20 Claims, 3 Drawing Sheets

| # | Step |
|---|---|
| 1 | REMOVING THE MARINE LOWER UNIT FROM THE MARINE ENGINE |
| 2 | REMOVING SOME MECHANICAL COMPONENTS FROM THE MARINE LOWER UNIT |
| 3 | CLEANING THE MARINE LOWER UNIT |
| 4 | PARTICLE BLASTING THE MARINE LOWER UNIT |
| 5 | WELDING A PREFORMED CASTING TO THE MARINE LOWER UNIT |
| 6 | CLEANING THE MARINE LOWER UNIT |
| 7 | PLACING THE MARINE LOWER UNIT IN A PREFORMED MOLD |
| 8 | POURING A HARDENABLE LIQUID POLYMERIC MATERIAL INTO PREFORMED MOLD |
| 9 | ALLOWING THE POLYMERIC MATERIAL TO HARDEN |
| 10 | REMOVING THE MARINE LOWER UNIT FROM MOLD |
| 11 | FINISH THE SURFACE OF THE MARINE LOWER UNIT |
| 12 | SAND THE SURFACE OF THE MARINE LOWER UNIT |
| 13 | PRIMING THE SURFACE OF THE MARINE LOWER UNIT |
| 14 | FINAL PAINTING OF THE SURFACE OF THE MARINE LOWER UNIT |

FIG. 1

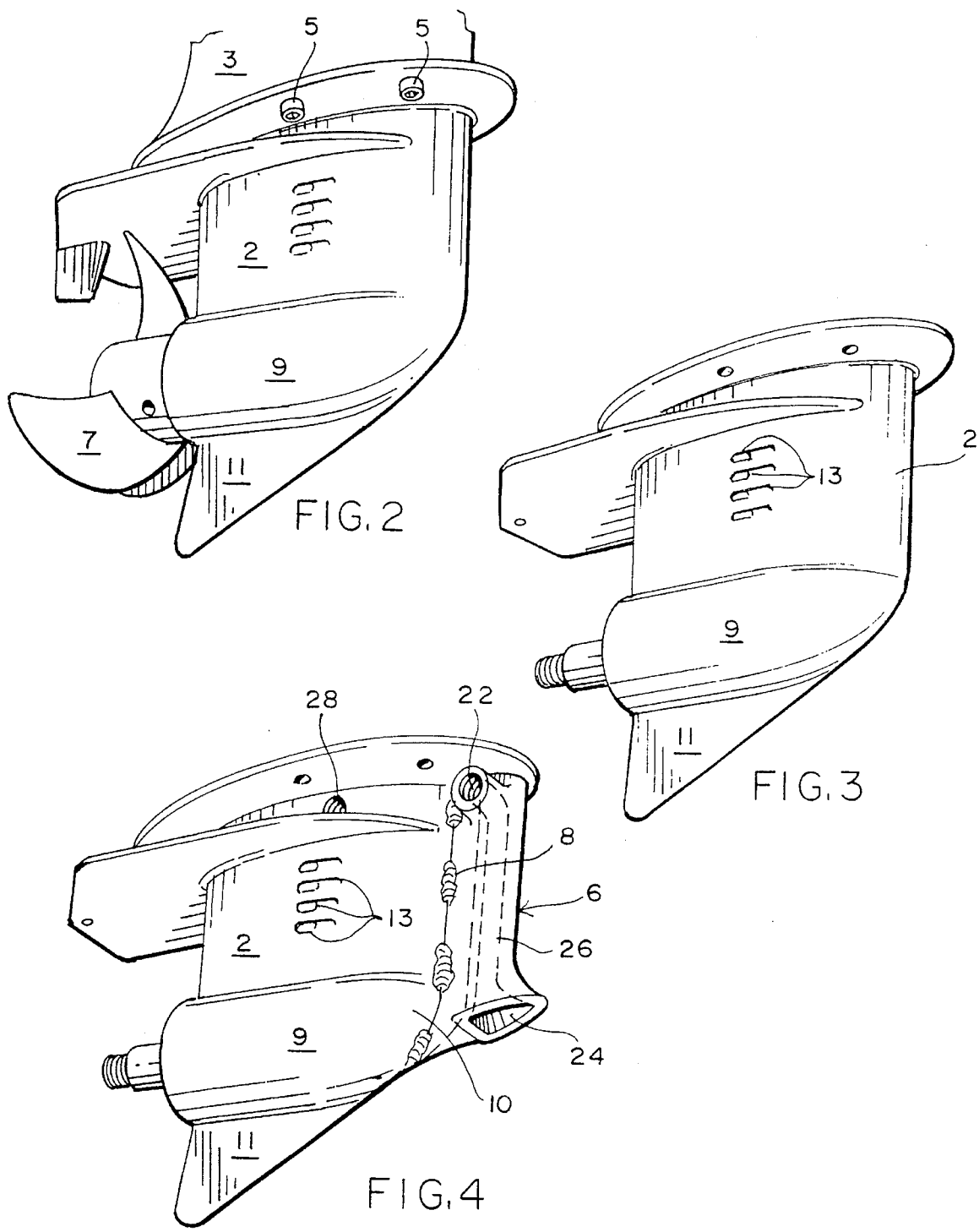

MARINE LOWER UNIT ALTERING PROCESS

FIELD OF THE INVENTION

This invention is concerned with a process for altering marine lower units. The reconfiguration of marine lower units has become popular in recent years. In accordance with this invention the lower unit of an outboard marine engine may be reconfigured in order to achieve a desired end. In most instances outboard marine engines are altered using the process of this invention in order to allow the outboard engine to operate in shallow water or to allow the outboard engine and the boat to which it is attached to achieve higher speed and/or greater operating efficiency. These ends are achieved in the prior art and in accordance with this invention by the welding of cast components to of the marine lower unit. In accordance with this invention the newly welded on cast component is quickly and efficiently attached to the marine lower unit.

In the prior art componets were added to marine lower units by the following generally described process.

First the marine, lower unit is removed from the marine engine the lubricant drained and the mechanical componets removed therefrom.

The marine lower unit is then cleaned and sand blasted to remove all paint in order to present a virgin metal surface.

A preformed casting which is adapted to mate with the external surface of the marine lower unit is then mated with the marine lower unit and held in place with an appropriate jig.

The casting is then welded in place. Since the casting and the marine unit are both aluminum a shielded welding process must be utilized.

At this stage the casting is securred to the marine lower unit however, it does not perfectly mate with or match the contour of the marine lower unit. It is in this area that this invention is particularly useful.

In the prior art the contours of the casting are blended into the contours of the marine lower unit by a fill, sand and shape process. The process uses in the prior art is similar to the fill, sand and blend process which is used in automotive body work.

In accordance with this invention the newly welded casting may be quickly and easily blended into the contours of the marine lower unit.

After the above described prior art process and in the process of this invention the finished unit is primed and painted.

Accordingly it is an object of this invention to provide a process whereby the lower unit of a marine engine may be quickly and efficiently altered.

It is a further object of this invention to provide a process whereby the cosmetic finish work on an altered marine lower unit can be quickly accomplished.

Likewise it is an object of this invention to provide a quick and efficient process for altering a marine lower unit in order to achieve greater speed and or more eficient water pick up.

It is also an object of this invention to provide a process whereby marine lower units can be quickly altered in order to allow the marine engine to operate in minimal water.

These objects and advantages should be construed as merely illustrative of some of the more prominent features and applications of the present invention. Accordingly, other objects and advantages, as well as a fuller understanding of the invention, may be had by referring to the summary and detailed description of the preferred embodiment of the invention in addition to the scope of the invention, as is defined by the specifications and claims taken in conjunction with the accompanying drawings.

SUMMARY OF THE INVENTION

The present invention is defined by the appended claims with the specific preferred embodiment shown in the attached drawings. For the purpose of summarizing the invention, the invention may be defined as a process whereby marine lower units can be quickly and easily altered. The invention comprises the steps of:

1. Removing the lower unit from the marine engine;
2. Removing some of the mechanical componets i.e. gears, shafts etc. from the lower unit;
3. Cleaning the marine lower unit;
4. Sand blasting the marine lower unit;
5. Welding a supplemental casting to the lower unit;
6. Clean the marine lower unit;
7. Place the marine lower unit in a mold which approximites the final desired shape of the lower unit;
8. Pour a catalyzed thermosetting polymeric resin into the mold and around the marine lower unit;
9. Allow the resin to harden;
10. Remove the marine lower unit from the mold;
11. Trim the marine lower unit and fill pores in the resin surface;
12. Sand the marine lower unit;
13. Prime the marine lower unit, and;
14. Finish paint the marine lower unit;

DESCRIPTION OF THE DRAWINGS

FIG. 1 is a flow chart showing the steps of the preferred embodiment of the process of this invention.

FIG. 2 is a perspective view showing a marine lower unit assembled to a marine engine.

FIG. 3 is a perspective view showing an assembled marine lower unit.

FIG. 4 is a perspective view showing a marine lower unit with components welded thereon.

DESCRIPTION OF THE PREFERRED EMBODIMENT

Figure 5:
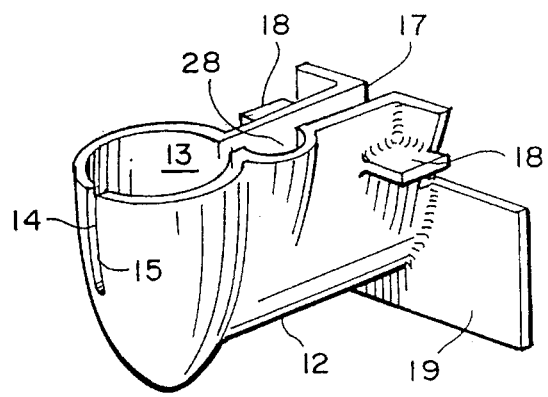
FIG. 5 is a perspective view showing a mold for use in this invention.

As is mentioned above this invention is concerned with a process for altering marine lower units, in particular the subject invention relates to a process wherein a marine lower unit can be substantially altered and returned to a finished state in a quick and easy fashion.

FIG. 1 illustrates in a flow chart format the various steps of the subject invention which are necessary to complete the process of this invention.

FIG. 2 illustrates a marine lower unit 2 which is attached to a marine engine 3 as can be seen marine lower unit 2 is attached to marine engine 3 via a plurality of bolts 5 in a conventional manner. Complete marine lower unit 2 further incorporates a propeller 7, a cone section 9 a skeg 11 and a water intake 13. During the process of this invention water intake 13 may be wholly or partially blocked.

FIG. 3 illustrates marine lower unit 2 after it has been removed from marine engine 3. Further it can be seen that the lower unit has been stripped of some of its mechanical parts such as the propeller 7. In this state lower unit 2 is in condition to start the process of the subject invention. The lower unit as is illustrated in FIG. 3 represents steps 1 and 2 as are depicted in FIG. 1.

After step 2 the cleaning process of step 3 of FIG. 1 is carried out by dipping or spraying lower unit 2 with a solvent cleaner in order to remove any foreign material and in particular traces of lubricants.

After the solvent cleaning of step 3 lower unit 2 is particle blasted with either sand or glass beads in order to remove all paint and other surface contamination. This particle blasting is conventional and hence is not illustrated Step 4 essentially presents a virgin metal surface for latter treatment.

Steps 1 through 4 of FIG. 1, as described above create a surface prepared, free standing marine lower unit 2 which is ready for alteration.

As is shown in FIG. 4 after cleaning and sand or glass bead blasting lower unit 2 is then placed in a holding jig (not shown) and a supplemetal casting 6 is positioned on lower unit 2, casting 6 being retained in position by jig (not shown).

It is understood by one skilled in the art that casting 6 in the preferred embodiment of this invention approximates the metallurgy of lower unit 2. When the metallurgy of casting 2 is similar to that of casting 6 maximum weld efficiency is achieved and the tendency for galvanic corrosion is minimized.

Since lower unit 2 is a marine grade aluminum casting it has been found that forming casting 6 from ALMAG-35 aluminum alloy produces satisfactory results.

Casting 6 further incorporates a threaded female boss 22 the function of which will be described herein below. Likewise casting 6 incorporates one or more water intake apetures 24. The number of, the placement of and the shape of apetures 24 can vary depending on the environment in which the finished marine engine, will be used.

Water passes from intake apetures 24 to boss 22 via passage way 26. Water intake 13 of marine lower unit 2 communicates with an internal water passage (not shown) in marine lower unit 2. During the process of this invention a hole is drilled into this passage and treaded to create apeture 28.

In order to secure casting 6 to lower unit 2 a bead of weld 8 is placed along mating edge 10 in order to secure casting 6 to lower unit 2. This welding sequence comprises step 5 of the subject invention as shown in FIG. 1 and as illustrated in FIG. 4.

As can be seen from an examination of FIG. 4 the welded lower unit 2 at this stage has an unfinished appearance.

Improving the appearance of the altered lower unit is where the process of this invention is particularly useful.

In accordance with step 6 of this invention the altered lower unit 2 is again sand or glass bead blasted and solvent cleaned in order to prepare lower unit 2 for further treatment.

FIG. 5 illustrates a mold 12 having a finished inside female surface 13 which approximates the outside shape of lower unit 2 before the subject process began.

Figure 6:
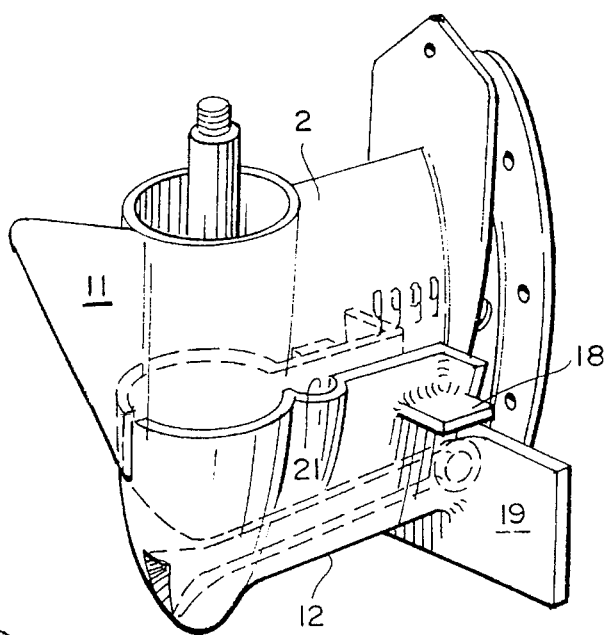
FIG. 6 is a perspective view showing a marine lower unit in the mold of FIG. 5.
Figure 7:
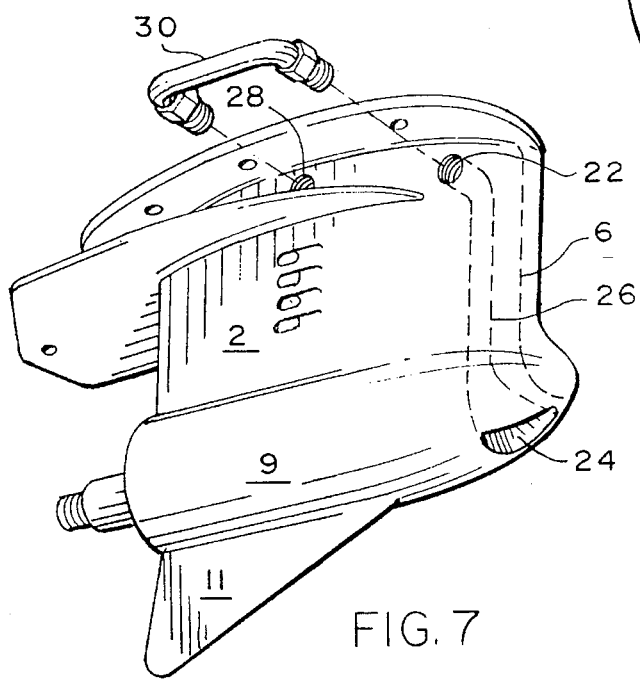
FIG. 7 is a perspective view showing the finishing of an altered marine lower unit.

FIG. 6 illustrates the placement of lower unit 2 in mold 12. Mold 12 incorporates a cut out portion 14 which allows skeg 11 to protrude from mold 12. After placing lower unit 2 into mold 12 a bead of caulking or other sealer is placed along edges 15 and 17. This caulking prevents the liquid thermosetting resin from escaping around edges 15 and 17 of mold 12.

Mold 12 further incorporates a pair of opposing tabs 18 and 20 and a support foot 19 which facilitate the holding and placement of mold 12 during the molding process. The placement of lower unit 2 in mold 12 comprises step 7 of the subject invention and is illustrated in FIG. 6.

In accordance with step 8 of this invention a batch of catalyzed thermosetting resin is prepared. Suitable thermosetting resins generally comprise epoxy resin systems and polyester resins.

In the case of epoxy resin systems preparation comprises the premixing of suitable volumes of an epoxy resin with a hardener.

In the case of polyester resins a suitable quanity of a polyester resin is mixed with a peroxide catalyst.

The thermosetting resin may be further mixed with a reinforcing medium such as chopped glass fibers. Fibers having a length of ¼ inch are preferred for use in this invention.

Prior to placing lower unit 2 into mold 12 and prior to placing the filler in the the thermosetting resin lower unit 2 may be painted with a wetting coat of the catalyzed thermosetting resin.

The preferred thermosetting resin for use in this invention is a polyester resin sold under the trademark Polygard resin as sold Polygard Inc. of Tampa, Fla. which resin is catalyzed with from about 3 to about 10 ml. of methyl ethyl ketone peroxide (MEK) per pound of polyester resin. The polyester resin may further be filled with chopped glass fibers and milled glass flour.

A preferred composition for use in accordance with this invention is in accordance with Table I.

TABLE I 2.25 pounds of Polygard Polyester resin
5 pounds milled glass flour
0.125 pound 0.25 inch glass fiber chop
10 ml. MEK Once lower unit 2 is positioned in mold 12 the catalyzed thermosetting resin is poured around lower unit 2 through sprew hole 21 and into the void which is present between the inner cavity of mold 12 and marine lower unit 2. During this pouring the catalyzed thermoset resin is a liquid state and hence it flows completely around the inside surface 13 of mold 12 as mold 12 is in a horizontal stance during the pouring operation of step 8 of FIG. 1.

In addition the thermosetting resin may be poured around all upper sides of mold 12.

It has been found that a charge of about two pounds of a thermosetting resin is sufficient for most alterations.

It is further understood by one skilled in the art that the catalyzed thermosetting resin may be pressure injected into the void which exist between lower unit 2 and the inner surface of mold cavity 12.

The inner surface 13 of mold 12 is treated with a release agent before lower unit 2 is placed therein.

The thermosetting resin is then given ample time to harden or cure. It has been found that 24 hours is ample for hardening or curing in most instances.

In order to facilitate the finishing properties of the hardened thermosetting resin this resin may be further filled with glass micro balloons.

This hardening comprises step 9 of FIG. 1 of the process of this invention.

Lower unit 2 is then removed from mold 12 and lightly sanded to remove flashing.

As a result of the nature of the thermosetting resins the surface of the hardened thermosetting resin has small pin holes. These pin holes are then filled with a polyester putty and sanded one or more times in order to create a perfect surface.

These steps comprise steps 10, 11 and 12 of the process of this invention.

The resulting surface is then primed with an etching primer and finish painted in accordance with conventional procedures, in order to duplicate the surface finish and color of the original lower unit 2. Once this painting is completed a tube 30 is then is then interconnected between apetures 22 and 28 thereby allowing water to flow from water intake 24, through passage 26, into tube 30 into intake 28 and into the water intake of marine lower unit 2.

To finish the total operation the altered marine lower unit is then reinstalled onto marine engine 3.

It is understood by one skilled in the art that modifications can be made to the process as described above without departing from the present invention the scope of which is to be limited only by the following claims:

What is claimed is:

1. A process for altering a surface-prepared free-standing marine lower unit which has been removed from a marine engine comprising the steps of;
   a. welding a preformed casting to said marine lower unit,
   b. placing the marine lower unit with the casting welded thereon in a preformed mold,
   c. pouring a hardenable liquid polymeric material into said mold, around the casting and that portion of the marine lower unit disposed in the mold,
   d. allowing the liquid polymeric material to harden,
   e. removing the marine lower unit from the mold.

2. The process of claim 1 further comprising surface finishing and painting the marine lower unit after its removal from the mold.

3. The process of claim 2 wherein the surface finishing comprises the steps of filling minor imperfections in the hardened polymeric material which are created in the molding process, and subsequently sanding the marine lower unit.

4. The process of claim 3 wherein the painting comprises priming the marine lower unit and subsequently finish painting the marine lower unit.

5. The process of claim 4 wherein the free-standing marine lower unit is prepared by the steps of removing the marine lower unit from the marine engine, removing some of the mechanical components from said marine lower unit, solvent cleaning the marine lower unit and particle blasting the marine lower unit.

6. The process of claim 4 wherein the hardenable liquid polymeric material is a member selected from the group consisting of catalyzed polyester resins and catalyzed epoxy resins.

7. The process of claim 6 wherein the hardenable liquid polymeric material is filled with a fiber reinforcing medium.

8. The process of claim 3 wherein the free-standing marine lower unit is prepared by the steps of removing the marine lower unit from the marine engine, removing some of the mechanical components from said marine lower unit, solvent cleaning the marine lower unit and particle blasting the marine lower unit.

9. The process of claim 2 wherein the free-standing marine lower unit is prepared by the steps of removing the marine lower unit from the marine engine, removing some of the mechanical components from said marine lower unit, solvent cleaning the marine lower unit and particle blasting the marine lower unit.

10. The process of claim 2 wherein the hardenable liquid polymeric material is a member selected from the group consisting of catalyzed polyester resins and catalyzed epoxy resins.

11. The process of claim 10 wherein the hardenable liquid polymeric material is filled with a fiber reinforcing medium.

12. The process of claim 1 wherein the free-standing marine lower unit is prepared by the steps of removing the marine lower unit from the marine engine, removing some of the mechanical components from said marine lower unit, solvent cleaning the marine lower unit and particle blasting the marine lower unit.

13. The process of claim 12 wherein the hardenable liquid polymeric material is a member selected from the group consisting of catalyzed polyester resins and catalyzed epoxy resins.

14. The process of claim 13 wherein the hardenable liquid polymeric material is filled with a fiber reinforcing medium.

15. The process of claim 12 wherein the hardenable liquid polymeric material is a catalyzed polyester resin which is filled with chopped glass fibers.

16. The process of claim 1 wherein the hardenable liquid polymeric material is a member selected from the group consisting of catalyzed polyester resins and catalyzed epoxy resins.

17. The process of claim 16 wherein the hardenable liquid polymeric material is filled with a fiber reinforcing medium.

18. The process of claim 16 wherein the hardenable liquid polymeric material is a catalyzed polyester resin which is filled with chopped glass fiber.

19. The process of claim 1 wherein the hardenable liquid polymeric material is a catalyzed polyester resin which is filled with chopped glass fibers.

20. The process of claim 1 wherein the hardenable liquid polymeric material is a catalyzed mixture of 2.25 pounds of polyester resin, 0.5 pound milled glass floud, 0.125 pound of 0.25 inch glass finer chop and 10 ml. of methyl ethyl ketone peroxide.

* * * * *